United States Patent
Nakata et al.

[11] Patent Number: 5,090,103
[45] Date of Patent: Feb. 25, 1992

[54] METHOD OF FASTENING SCREW MEMBERS WHICH ARE SUPPORTED BY A FASTENER CARRIER

[75] Inventors: Akio Nakata; Masahiro Yoshida; Koshiro Nakajima, all of Hirakata, Japan

[73] Assignee: Matsushita Electric Industrial Co., Ltd., Osaka, Japan

[21] Appl. No.: 468,278

[22] Filed: Jan. 22, 1990

Related U.S. Application Data

[60] Division of Ser. No. 403,057, Sep. 1, 1989, Pat. No. 4,955,476, which is a continuation of Ser. No. 136,636, Dec. 22, 1987, abandoned.

[30] Foreign Application Priority Data

| Dec. 25, 1986 | [JP] | Japan | 61-311354 |
| Dec. 29, 1986 | [JP] | Japan | 61-311011 |
| Jan. 12, 1987 | [JP] | Japan | 62-4345 |
| Jan. 12, 1987 | [JP] | Japan | 62-4346 |
| Jan. 16, 1987 | [JP] | Japan | 62-8490 |

[51] Int. Cl.$^5$ .............................................. B23P 17/00
[52] U.S. Cl. ........................................ 29/418; 29/430; 29/432; 29/525; 29/559
[58] Field of Search ............... 29/413, 418, 430, 432, 29/525, 525.1, 559; 206/338, 343, 345, 346, 347, 486, 820

[56] References Cited

U.S. PATENT DOCUMENTS

| 3,892,313 | 7/1975 | Lange | 206/347 X |
| 4,007,834 | 2/1977 | Borgersen | 206/347 X |
| 4,018,334 | 4/1977 | Lejdegard | 206/347 X |
| 4,019,631 | 4/1977 | Lejdegard et al. | 206/347 |
| 4,047,611 | 9/1977 | Damratowski | 206/347 |
| 4,627,316 | 12/1986 | Mori et al. | 81/435 X |
| 4,864,713 | 9/1989 | Roberts et al. | 29/559 |

*Primary Examiner*—Mark Rosenbaum
*Assistant Examiner*—Frances Chin
*Attorney, Agent, or Firm*—Wenderoth, Lind & Ponack

[57] ABSTRACT

A fastener carrier for the support of screw members which comprises a carrier strip having a substantial length and having at least one row of apertures defined therein in a direction lengthwise of the carrier strip, and screw members each having a head and a stem and removably mounted on the carrier strip with the stem received in the corresponding aperture in the carrier strip.

11 Claims, 5 Drawing Sheets

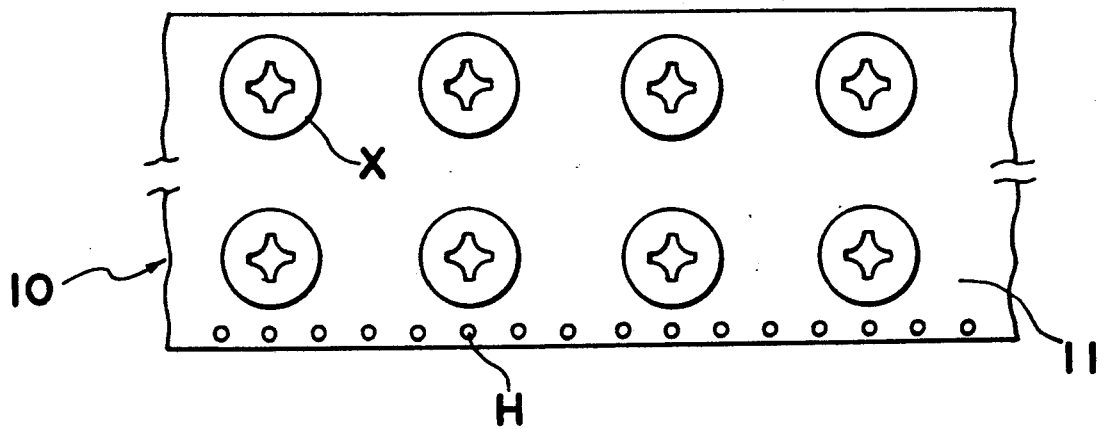
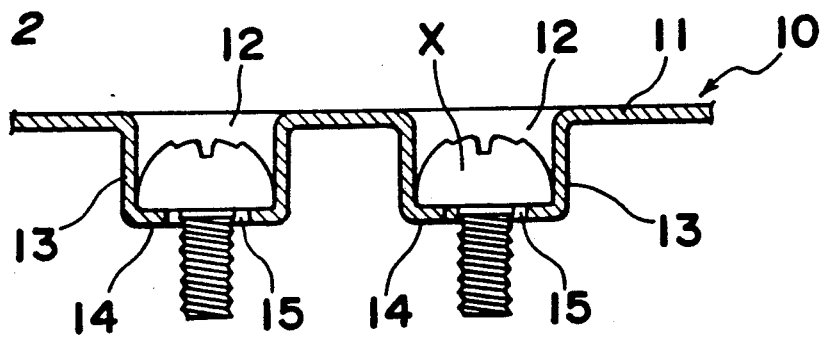
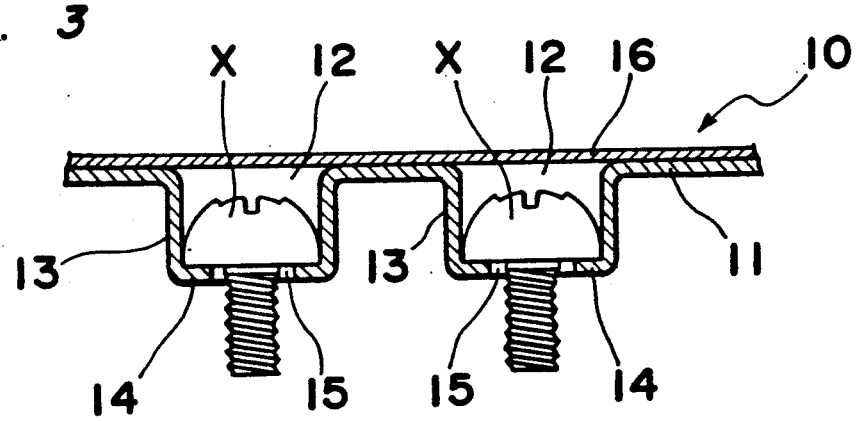
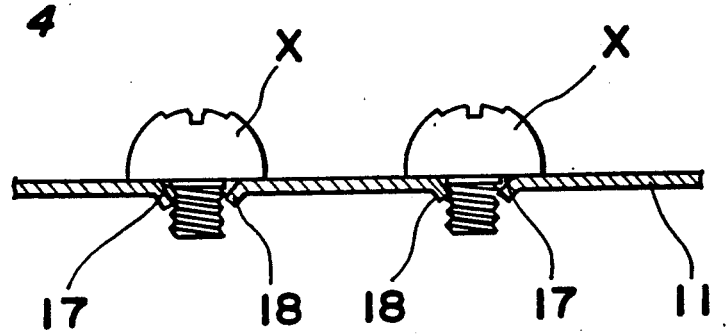

METHOD OF FASTENING SCREW MEMBERS WHICH ARE SUPPORTED BY A FASTENER CARRIER

This is a Rule 60 Divisional application of Ser. No. 07/403,057 filed Sept. 1, 1989 now U.S. Pat. No. 4,955,476 which in turn is a Rule 62 Continuation of now abandoned Ser. No. 07/136,636 filed Dec. 22, 1987 now abandoned.

BACKGROUND OF THE INVENTION 1. (Field of the Invention)

The present invention generally relates to a continuous fastener carrier for use with an automatic fastening machine and, more particularly, to a fastener carrier comprising a carrier strip having fasteners removably mounted on the carrier strip in at least one row over the length of such a carrier strip.

The present invention also relates to a fastening method for driving a fastening member, which method can be practiced with the use of the continuous fastener carrier of the type referred to above having at least one row of fastening members removably mounted on the carrier strip.

2. (Description of the Prior Art)

An automatic fastening machine is currently widely used in industries that manufacture structural elements by driving fastening members such as, for example, screws, bolts or rivets onto the structural elements. In general, when the products manufactured are compact and light-weight, the automatic fastening machine handles relatively small screw members. The automatic fastening machine currently available for driving screw members onto small, or miniature, structural elements comprises a pneumatic or electric screw driver and a supply unit including a hopper for accommodating therein a mass of screw members and a chute for guiding the screw members one by one towards the screw driver.

A specific example of the prior art automatic fastening machine operable with screw members each having a head and an externally threaded stem will now be discussed with particular reference to FIGS. 15 to 17 of the accompanying drawings.

Referring first to FIG. 15 illustrating the supply unit in a schematic side sectional view, the hopper and the chute are generally identified by 100 and 101, respectively. The hopper 100 is used to accommodate therein a mass of screw members each having a head and an externally threaded stem and has a slot defined generally at the bottom thereof. The chute 101 is a generally elongated bar having a guide groove 102 defined therein so as to extend axially from one end to the opposite end thereof and having one end protruding into and rigidly secured to the hopper 100. The chute 101 is inclined downwardly from the hopper 100 with its opposite end operatively associated with the screw driver as will be described later.

For enabling some of the screw members within the hopper 100 to be scooped upwardly and then transferred onto the chute 101, a generally sector-shaped scraper 103 is employed. This scraper 103 is adapted to be driven by an electric motor 104 for pivotal movement between raised and lowered positions about a bearing pin 105 and is formed at 106 with a groove which is, when the scraper 103 is moved to the raised position as shown in FIG. 16, brought into alignment with the groove 102 in the chute 101. This scraper 103, regardless of the position thereof, closes the slot defined at the bottom of the hopper and, therefore, there is no possibility of some of the screw members falling out of the hopper 100 through the slot.

The chute 101 also has an overhead bar 107 extending immediately above and in alignment with the guide groove 102 in the chute 101 and spaced therefrom a distance corresponding to the thickness of each of the heads of the screw members such that each of the screw members being slid along the chute 101 will not separate from the guide groove 102. A gating member 108 is secured to one end of the overhead bar 107 adjacent the hopper 100 for ejecting back into the hopper 100 the screw members which are transferred onto the chute 101 with the wrong orientation as will be described later.

The supply unit having the structure described hereinabove operates in the following manner. Assuming that the scraper 103 is in the lowered position as shown in FIG. 15, when the motor 104 is driven, the scraper 103 pivots about the bearing pin 105 from the lowered position towards the raised position with some of the screw members being scooped upwardly by the scraper 103. Some of those screw members so scooped upwardly by the scraper 103 may have their stems received in the groove 106 as indicated by X in FIG. 16 and some of them may have their stems oriented upwardly as indicated by Y in FIG. 16. As the scraper 103 approaches the raised position, the screw members so scooped start sliding along the groove 106 and, as soon as the scraper 103 arrives at the raised position shown in FIG. 16, the screw members sliding downwards along the groove 106 are successively transferred onto the chute 101 with their stems received in the groove 102 in the chute 101.

However, the gating member 108 permits the passage thereunder of only the screw members having the proper orientation, that is, the screw members X having their stems received in the groove 106, and ejects from the scraper 103 the screw members having the wrong orientation, that is, the screw members Y having their stems not received in the groove 106.

The supply unit used in the prior art fastening machine has problems in that, when each of the screw members handled thereby is of a type in which the stem has a relatively small length as compared with the outer diameter thereof, the screw members will not be correctly received in the groove 106 in the scraper 103 because this type of screw member generally has a center of gravity lying in the head and that. Where each of the screw members handled thereby is of a type in which the stem has a relatively small outer diameter, the screw members can hardly be received in the groove 106 in the scraper 103. Moreover, since the exact alignment between the groove 106 in the scraper 103 and the groove 102 in the chute 101 at the transition point between the scraper 103 and the chute 101 is difficult to achieve, a smooth transfer of the screw members from the scraper 103 onto the chute 101 cannot be achieved.

The screw driver used in the prior art fastening machine is best illustrated in FIG. 17 and comprises a vacuum sleeve 109 communication in any suitable manner with a source of substantial vacuum and having a screwing bit 110 accommodated therein for axially sliding relative to the sleeve 109. This screw driver is supported for movement up and down between a raised position, shown by the solid line, and a lowered position shown by the phantom line, past a screw receiving station at which the screw member is caught by the screw driver with its head sucked onto the sleeve 109.

At the screw receiving station, a generally U-shaped screw holder 111 is disposed and rotatably mounted on a support shaft 112 for pivotal movement about such support shaft 112 between a receiving position, shown by the solid line, and a release position shown by the phantom line. However, the screw holder 111 is normally biased to the receiving position by the action of a torsion spring 113 mounted on the bearing shaft 112. This screw holder 111 has a groove defined therein having a width identical to that of the groove 102 in the chute 101 and is positioned in the vicinity of the end of the chute 101 that is remote from the hopper 100 (FIGS. 15 and 16) so that each of the screw members transferred through the chute 101 can fall by gravity onto the screw holder 111 with the respective stem received in the groove in the screw holder 111 as shown by Xa. The other screw members following the screw member which has been transferred onto the screw holder 111 in the manner as hereinabove described are retained on the chute 101 by the action of an escapement 114 supported by the chute 101 for pivotal movement between a blocking position, as shown by the solid line, and a retracted position. This escapement 114 is operable to permit the screw members on the chute 101 to be successively delivered onto the screw holder 111 one at a time while reciprocally pivoting between the blocking and retracted positions.

The screw driver operates in the following manner. Assuming that one screw member Xa has been delivered onto the screw holder 111 while the latter is in the receiving position, the screwing bit 110 is lowered together with the sleeve 109. During the lowering of the screw driver, the lower end of the sleeve 109 is brought into contact with the head of the screw member Xa, thereby holding the screw member Xa under suction. The continued lowering of the screw driver causes the screw holder 111 to pivot against the torsion spring 113 from the receiving position towards the release position, while allowing the screw member Xa to leave the groove in the screw holder 111. Shortly before or simultaneously with the arrival of the sleeve 109 at the lowered position shown by the phantom line, the screwing bit 110 is lowered while being driven about its longitudinal axis so that the screw member can be eventually driven or threaded into a structural element by the screwing bit 110.

After the completion of the fastening operation, both the sleeve 109 and the screwing bit 110 are elevated towards the raised position in readiness for the next succeeding cycle of the fastening operation.

The screw driver used in the prior art fastening machine has problems in that, when each of the screw members handled thereby is of a type in which the stem has a relatively small length as compared with the outer diameter thereof, the screw members tend to be upset during the delivery thereof from the chute 101 onto the screw holder 111 because this type of screw member generally has a center of gravity lying in the head and in that, when each of the screw members handled thereby is of a type in which the stem has a relatively small outer diameter, not only can the screw members riding on the chute 101 hardly be separated one by one by the action of the escapement 114, but also each screw member delivered onto the screw holder 111 tends to be so instable as to cause the vacuum sleeve 109 to fail to hold the screw member properly.

Apart from the above-discussed prior art screw driver, another version is well known which employs a screw feed sleeve having a branch pipe offset laterally from the feed sleeve. The branch pipe is coupled through a flexible tubing and then through the escapement assembly with a source of screw members which may, for example, be a hopper having a structure as shown in and described with reference to FIGS. 15 and 16.

SUMMARY OF THE INVENTION

The present invention has been developed to substantially eliminate the above-discussed problems and has as its essential object to provide a novel fastener carrier comprising a carrier strip having screw members removably mounted on the carrier strip in at least one row over the length of the carrier strip, which carrier strip advantageously eliminates the use of the hopper, the guide chute and the screw holder used in and described with reference to the prior art fastening machine.

Another important object of the present invention is to provide a novel fastener carrier of the type referred to above, which is effective to speed up the fastening operation and which substantially eliminates the possibility of a screw member ready to be driven into a corresponding hole in a structural element moving or having been moved out of alignment with the hole.

It is a related object of the present invention to provide a fastening method that is practiced with the use of the fastener carrier of the type referred to above.

In order to accomplish the above-described objects of the present invention, there is provided a fastener carrier which comprises a carrier strip having a substantial length and at least one row of apertures defined therein in a direction lengthwise of the carrier strip, and screw members each having a head and a stem and removably mounted on the carrier strip with the stem received in the corresponding aperture in the carrier strip.

Each of the apertures in the carrier strip may be either a round hole extending completely through the carrier strip and having a diameter that is large enough to permit the stem of the screw member to pass therethrough, or a perforation extending completely through the the carrier strip and enclosed by a plurality of tags.

Where it is desired to avoid any possible separation of one or more screw members from the carrier strip during, for example, transportation, a covering having a width equal to that of the carrier strip may be applied over the carrier strip to retain the screw members on and the carrier strip.

Preferably, the carrier strip has recesses or pockets formed therein in at least one row extending in a direction lengthwise thereof, each of said recesses being defined by a peripheral wall perpendicular to the remainder of the carrier strip and a support wall parallel to the remainder of the carrier strip, and the apertures are defined in the support walls, respectively. When the carrier strip has the recesses defined therein, the head of each of the screw members may be accommodated within a respective recess with its stem extending through the associated aperture or, alternatively, the head of each of the screw members may rest on the respective support wall with its stem extending into the respective recess through the associated aperture.

When at least one of the screw members carried on the carrier strip according to the present invention is to be threaded into any structural element, a screw driver or similar screwing bit is pressed against such screw member, carried by the carrier strip, to cause the latter to break through that portion of the carrier strip which surrounds the screw member.

Alternatively, when a screw driver comprising a vacuum sleeve, fluid-coupled with a source of substantial vacuum, and a screwing bit operatively housed within the vacuum sleeve, such as that shown in and described with reference to FIG. 18, is used to drive one or more screw members carried by the carrier strip, the vacuum sleeve may be used to suck a respective screw member and then transport it to a predetermined site at which the screw member is actually fastened to a structural element.

In any event, according to the present invention, the screw members are removably retained in position by the carrier strip when they are being supplied to the fastening station. Accordingly, even miniature screw members having externally threaded stems that are either shorter or longer than the diameter of each of the heads thereof can be supplied reliably without a substantial possibility of one or some of the screw members having been removed during the supply thereof. Moreover, the screw member itself need not be supported when being actually driven, because the carrier strip itself serves this purpose.

BRIEF DESCRIPTION OF THE DRAWINGS

These and other objects and features of the present invention will become clear from the following description taken in conjunction with preferred embodiments thereof with reference to the accompanying drawings, in which:

FIG. 1 is a schematic top plan view of a portion of a carrier strip according to the present invention;

FIGS. 2 to 4 are schematic side sectional views of the carrier strips according to first, second and third preferred embodiments of the present invention;

DETAILED DESCRIPTION OF THE PREFERRED EMBODIMENTS

Figure 5:
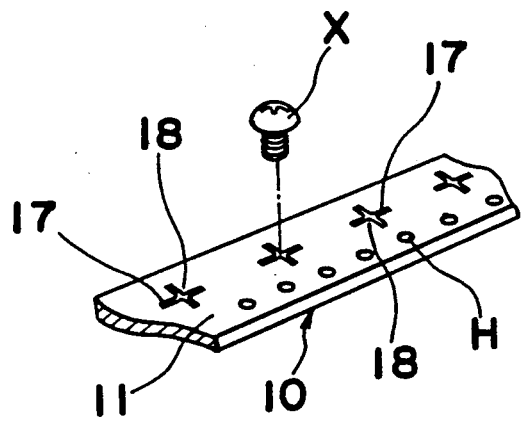
FIGS. 5 is a schematic perspective view of the carrier strip shown in FIG. 4.

Before the description of the present invention proceeds, it is to be noted that like parts are designated by like reference numerals throughout the several views of the accompanying drawings.

Referring first to FIGS. 1 and 2 showing the first preferred embodiment of the present invention, a carrier strip generally identified by 10 comprises a support strip 11 having a width and a length and also having upper and lower surfaces opposite to each other as seen in FIG. 2. The support strip 11 is provided with one or more rows of pockets 12 by forming downwardly extending recesses in a plate member forming the support strip 11 which open upwardly as seen in FIG. 2. Each of the pockets 12 so formed is defined by a peripheral wall 13 extending transverse to the remainder of the support strip 11 and a bottom wall 14 spaced from and parallel to the remainder of the support strip 11.

Preferably, each pocket 12 has a depth sufficient to permit the head of each screw member X to be either completely or partially accommodated within the respective pocket 12.

The support strip 11 also has apertures defined therein. In the embodiment shown in FIG. 2, each of the apertures in the support strip 11 is in the form of a round hole 15 defined in the associated bottom wall 14 and extending completely through the bottom wall 14.

Screw members X each having a head and an externally threaded stem are received within the associated pockets 12 with their heads resting on the bottom walls 14 while their stems extend through the respective round holes 15. Each round hole 15 in the respective bottom walls 14 has a diameter substantially equal to or slightly greater than the external diameter of the threaded stem of each screw member X, but does not permit the head of each screw member to pass therethrough.

In a second preferred embodiment of the present invention shown in FIG. 3 the carrier strip 10 has a similar structure to that shown in and described with reference to FIG. 2. However, in the embodiment of FIG. 3, each of the pockets 12 has a depth substantially equal to or slightly greater than the thickness of the head of each of the screw members X carried by the carrier strip 10, a covering 16 is applied over the support strip 11 to close the opening leading into each of the pockets 12, thereby preventing the screw members X from falling out of the respective pockets 12.

The covering 16 may be a commercially available adhesive tape, a strip of aluminum foil or any suitable tape having a width which may be either equal to or smaller than the width of the carrier strip. In any event, the single covering 16 may be employed either for all of the rows of the pockets 12 or for some of the rows of the pockets 12. Also, instead of the use of an adhesive material, the covering 16 may be heat-sealed to the support strip 11.

In practicing the present invention, the pockets accommodating the respective screw members therein are not always essential. For example, as shown in FIGS. 4 and 5 showing a third preferred embodiment of the present invention, the support strip 11 is an elongated flat thin plate having a row of apertures defined therein over the entire length thereof and spaced a predetermined distance, preferably an equal distance, from each other. Each of the apertures defined in the support strip 11 shown in FIGS. 4 and 5 is a cross-shaped slotted perforation 17 extending completely through the carrier strip and is enclosed by four resilient tags 18 converging at the center of the slotted perforation 17.

With the screw members X having not yet been mounted on the carrier strip 10 of the embodiment of FIGS. 4 and 5, the tags 18 for each cross-shaped perforation 17 are flush with the remainder of the support strip 10. However, they will be downwardly deformed, as viewed in FIG. 4, as the stem of the respective screw member X is passed from above through the cross-shaped perforation 17, thereby retaining the respective screw member X in position on the support strip 11. The shape of each of the slotted perforations 17 is not limited to that shown and described, but may be any suitable shape in which two, four or more resilient tags are defined all converging at the center of the slotted perforation.

Figure 6:
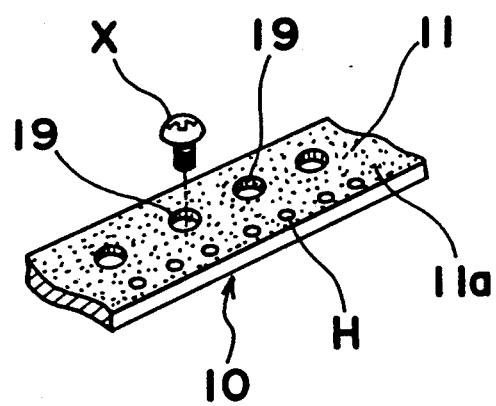
FIG. 6 is a schematic perspective view of the carrier strip according to a fourth embodiment of the present invention.

In the fourth embodiment shown in FIG. 6, the support strip 11 is an elongated flat thin plate having a row of apertures defined therein over the entire length thereof and spaced a predetermined distance, preferably an equal distance, from each other. Each of the apertures defined in the support strip 11 shown in FIG. 6 is of a round hole 19 extending completely through the support strip 11. Each round hole 19 in the support strip 11 shown in FIG. 6 has a diameter slightly greater than the external diameter of the threaded stem of each of the screw members X so that the screw member can readily be removed from the associated round hole 19.

Referring still to FIG. 6, in order to avoid any possible separation or detachment of any one of the screw members X from the carrier support 10, the support strip 11 has a layer of adhesive material 11a disposed on the upper surface thereof. It is, however, to be noted that, instead of applying the adhesive layer 11a over the entire upper surface of the support strip 11, it may be applied to only an annular portion of the support strip 11 that is defined peripherally around each round hole 19 and which may contact the annular undersurface of the head of the screw member X.

Figure 7:
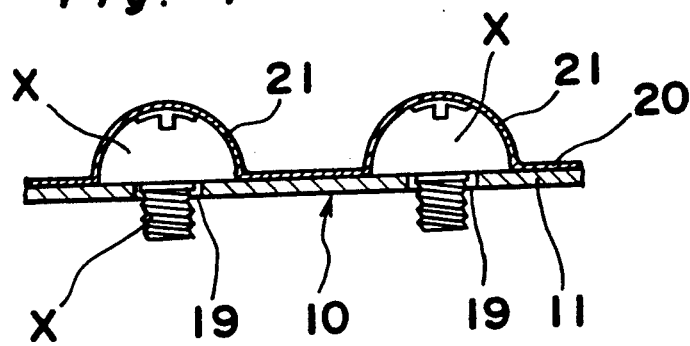
FIG. 7 is a schematic side sectional view of the carrier strip according to a fifth embodiment of the present invention.
Figure 8:
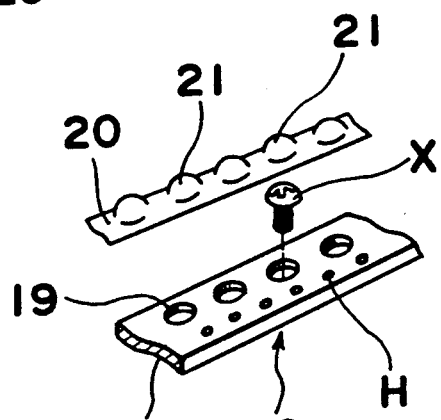
FIG. 8 is a schematic perspective view of the carrier strip shown in FIG. 7.

According to a fifth embodiment of the present invention shown in FIGS. 7 and 8, the carrier strip 10 having the structure shown in and described with reference to FIG. 6 is provided with a covering 20 having one or more rows of blisters 21 formed therewith that are alignable with the respective row or rows of the round holes 19 in the support strip 11. The covering 20 may be laid on the support strip 11 in a manner similar to the covering 16 shown in and described with reference to FIG. 3.

Figure 9:
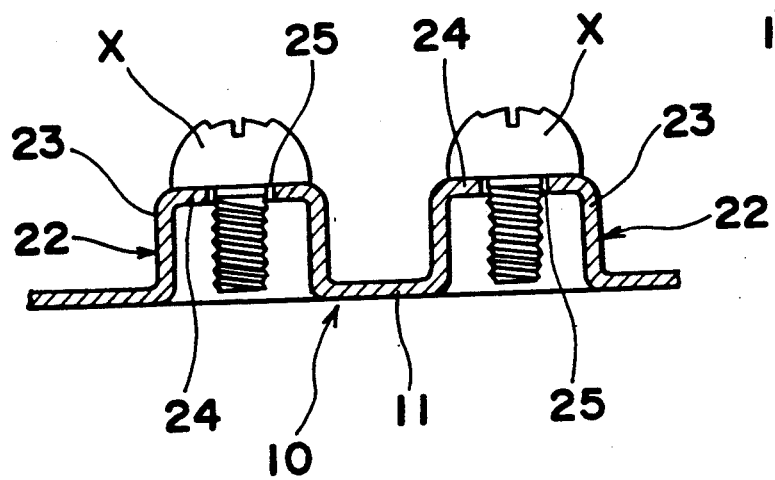
FIG. 9 is a schematic side sectional view of the carrier strip according to a sixth embodiment of the present invention.

The carrier strip 10 according to a sixth embodiment of the present invention shown in FIG. 9 may be considered an inverted version of the carrier strip shown in FIG. 2. More specifically, as shown in FIG. 9, the support strip 11 is provided with one or more rows of generally cylindrical projections 22 by forming upwardly extending recesses in a plate member forming the support strip 11 which to open downwardly as viewed in FIG. 9. Each of the cylindrical projections 22 so formed is defined by a peripheral wall 23 extending transverse to the remainder of the support strip 11 and a top wall 24 spaced from and parallel to the remainder of the support strip 11.

Preferably, each cylindrical projection 22 has a height, as measured above the remainder of the support strip 11, that is sufficient to permit the threaded stem of each screw member X to be either completely or partially, preferably completely, accommodated within a space inside the respective cylindrical projection 22.

Even this support strip 11 also has one or more rows of round holes 25 defined in the associated top walls 24 and extending completely therethrough.

Screw members X are mounted on the associated cylindrical projections 22 with their heads the top walls 24 while their stems extend through the respective round holes 25. Each round hole 25 in a respective top wall 24 has a diameter substantially equal to or slightly greater than the external diameter of the threaded stem of each screw member X, but does not permit the head of each screw member to pass therethrough.

The carrier strip having at least one row of screw members mounted thereon and spaced lengthwise along the carrier strip can be utilized in association with an automatic fastening machine. Specifically, the screw members carried by the carrier strip can be automatically removed from the carrier strip one by one by an automatic screw driver at a fastening station while the carrier strip is intermittently supplied so as to permit each of the screw members to be brought into register with the screw driver. For this purpose, the support strip 11 of the carrier strip 10 according to any one of the foregoing embodiments has a series of equally spaced feed holes H defined in at least one of opposite side edge portions of the support strip 11 as best shown in FIGS. 1, 5, 6 and 8 for engagement with feed pins (not shown). If the support strip 11 has a substantial width and a substantial number of rows of the screw members, the feed holes H may be provided on both side edge portions of the support strip 11.

The specific manner in which the screw members carried by the carrier strips having the structures according to any one of the foregoing embodiments will now be described with particular reference to FIGS. 10 to 14.

Figure 10:
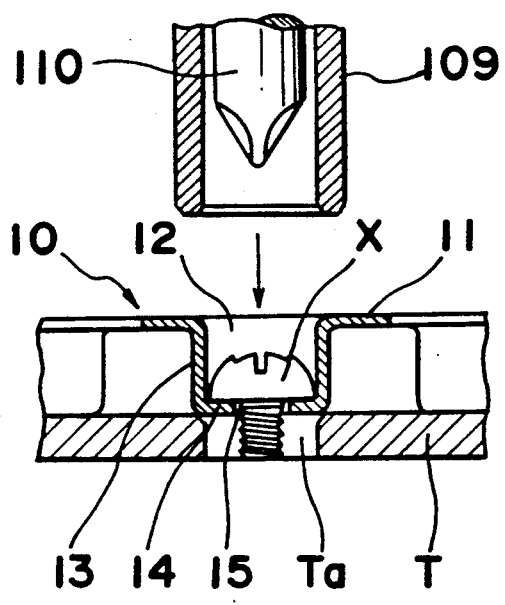
FIGS. 10 and 11 are schematic side sectional views showing the manner in which a screw member carried by the carrier strip shown in FIG. 2 is driven into a workpiece, with a screw driver held at different operative positions, respectively.
Figure 11:
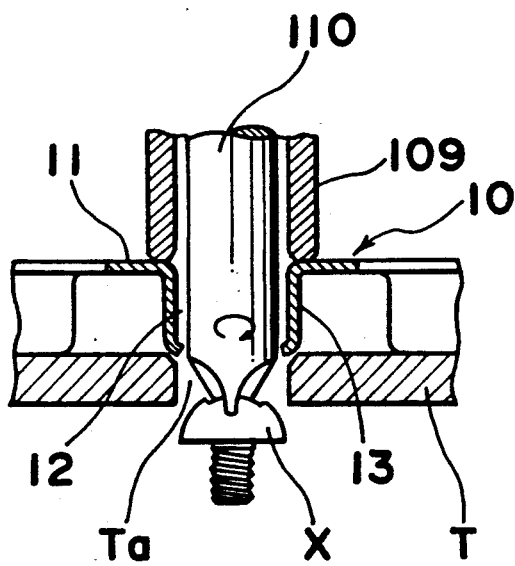

Referring to FIGS. 10 and 11, the carrier strip 10 having the structure shown in and described with reference to FIG. 2. intermittently supplied towards the fastening station where a support table T having at least one opening Ta (the exact number of openings Ta corresponding to the number of rows of the screw members on the carrier strip 10) defined therein is disposed for supporting the carrier strip 10 from below. The opening Ta in the support table T has a diameter greater than the diameter of the head of each screw member X, but smaller than the outer diameter of the peripheral wall 13 defining the respective pocket 12.

Assuming that the carrier strip 10 has been transported to the fastening station with a particular one of the pockets 12 aligned coaxially with the opening Ta in the support table T as shown in FIG. 10, the screw driver is lowered until the vacuum sleeve 109 contacts the support strip 10 as shown in FIG. 11. The screwing bit 110 driven in one direction about its longitudinal axis is lowered so as to protrude outwardly from the vacuum sleeve 109 and into the pocket 12 now aligned with the opening Ta in the table T thereby engaging the associated screw member X as shown in FIG. 11. The continued lowering of the screwing bit 110 while being driven causes the associated screw member X to break the bottom wall 14 so that such associated screw member X is driven out of the pocket 12 in the direction in which the screwing bit 110 is lowered and is subsequently threaded into a workpiece positioned beneath the support table T. As a matter of course, the cross-shaped tip of the screwing bit 110 can be assuredly engaged in the cross-shaped groove on the head of each screw member X as the tip of the screwing bit 110 is, while being rotated, brought into contact with the head of the screw member X.

In the example shown in FIGS. 12 and 13, the carrier strip 10 having the structure shown in and described with reference to FIG. 3 is intermittently supplied towards a pick-up station along the support table T having a guide groove Tb defined on an upper surface thereof for receiving the stems of the screw members which protrude outwardly through the round holes 15.

Figure 12:
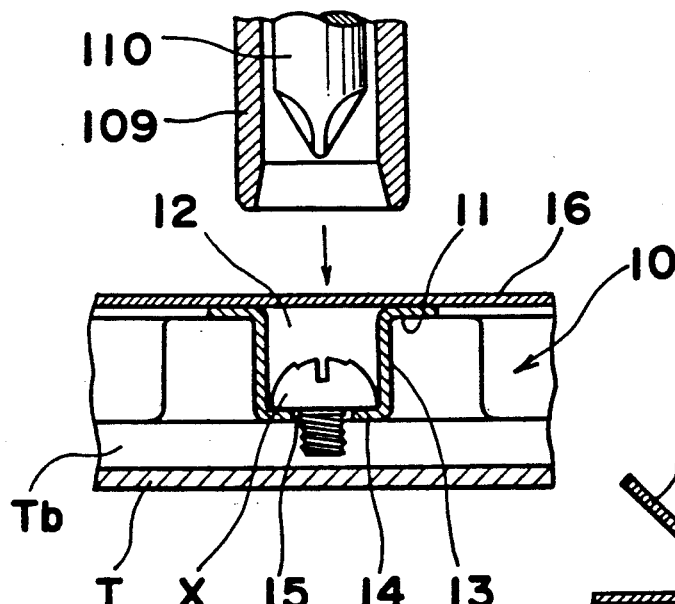
FIGS. 12 and 13 are schematic side sectional views showing the manner in which a screw member carried by the carrier strip shown in FIG. 3 is driven into a workpiece, with a screw driver held at different operative positions, respectively.

As the carrier strip 10 approaches the pick-up station with a particular one of the pockets 12 aligned coaxially with and positioned immediately below the screw driver as shown in FIG. 12, the covering 16 is peeled off in any suitable manner to expose a particular one of the screw members X to the screw driver. Thereafter, the screw driver is lowered until the vacuum sleeve 109 contacts the support strip 10 as shown in FIG. 13, so that the screw member X within one of the pockets 12 then aligned with the screw driver can be sucked upwardly by suction into the sleeve 109 until the head of the screw member X contacts the tip of the screwing bit 110.

Figure 14:
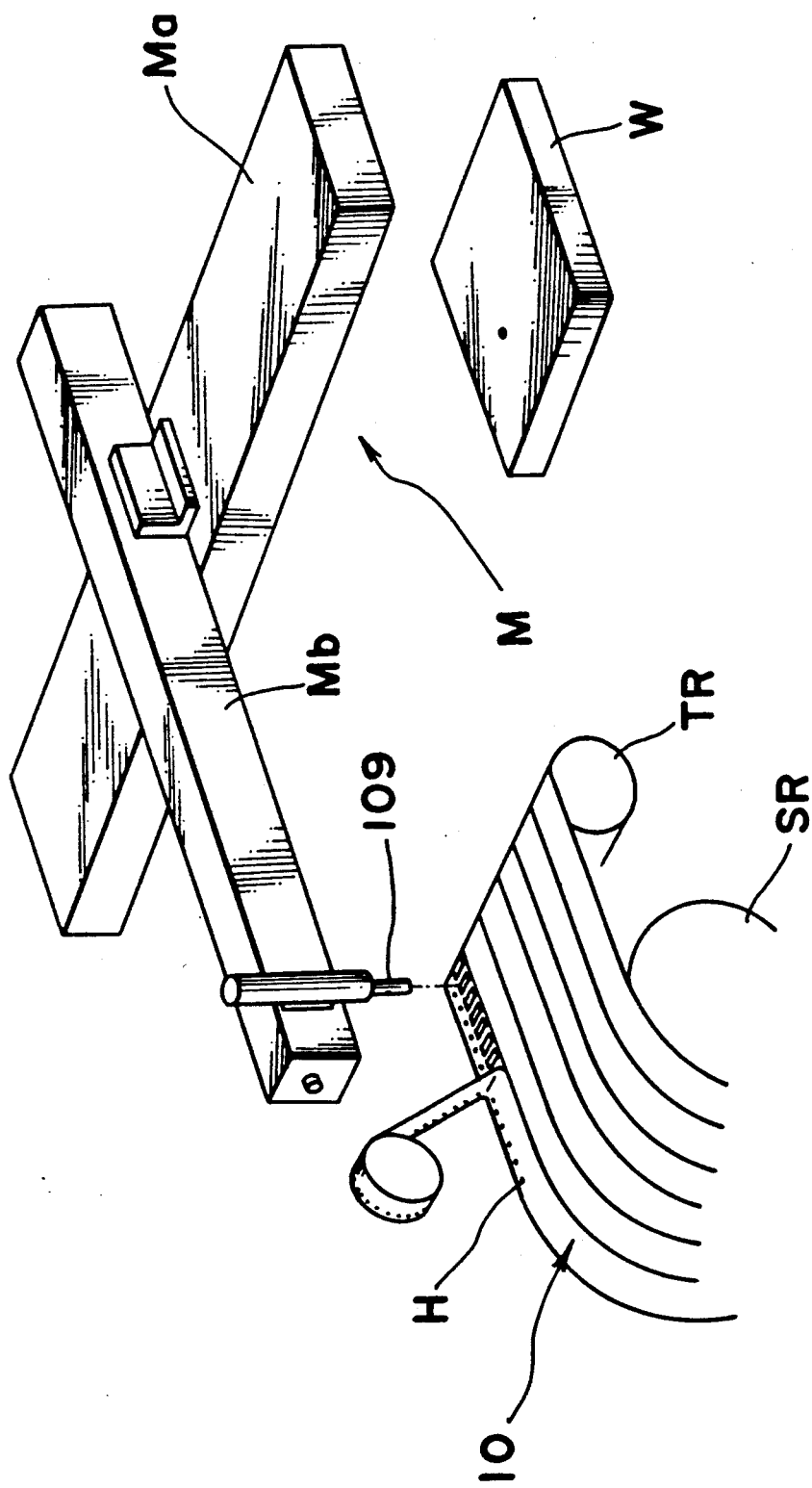
FIG. 14 is a schematic perspective view showing an automatic fastening machine used to practice the fastening method shown in FIGS. 12 and 13.
Figure 15:
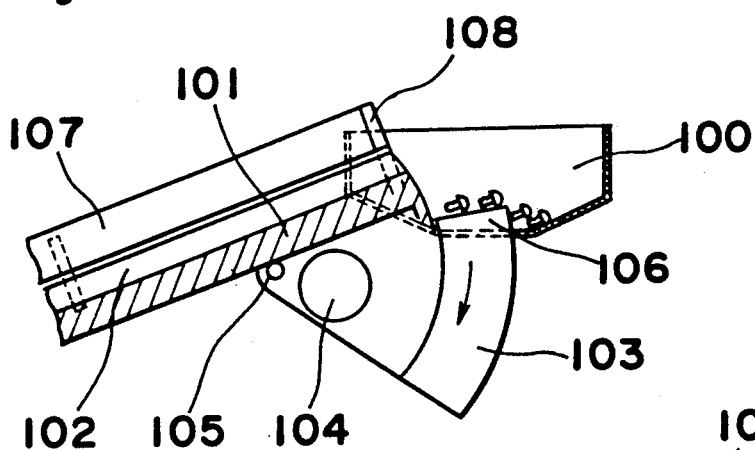
FIGS. 15 and 16 are schematic side sectional views of the prior art screw supply unit, with a screw scraper held at different operative positions, respectively.
Figure 16:
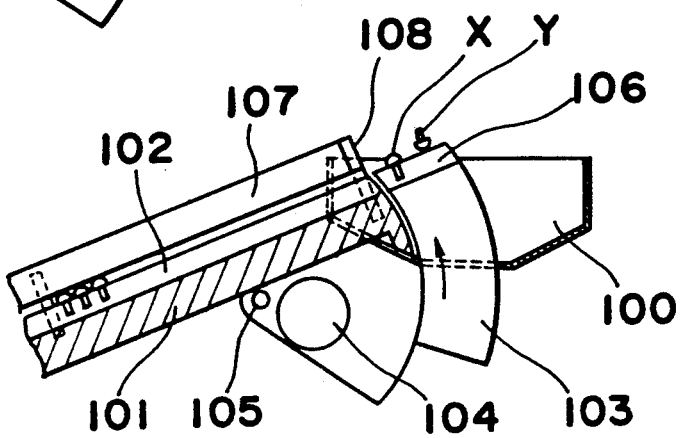
Figure 17:
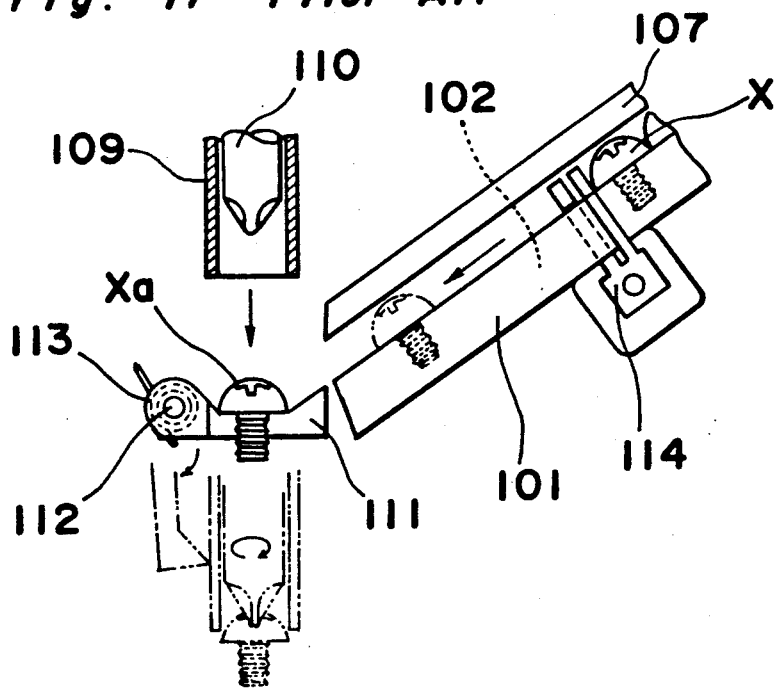
FIG. 17 is a schematic side view, with a portion cut away, showing the prior art screw driver.

The screw driver having sucked the screw member X into the sleeve 109 is then moved towards the fastening station at which the actual threading of the screw member into the workpiece, shown by W in FIG. 14, is carried out in a manner similar to that described in connection with the example shown in FIGS. 10 and 11.

Figure 13:
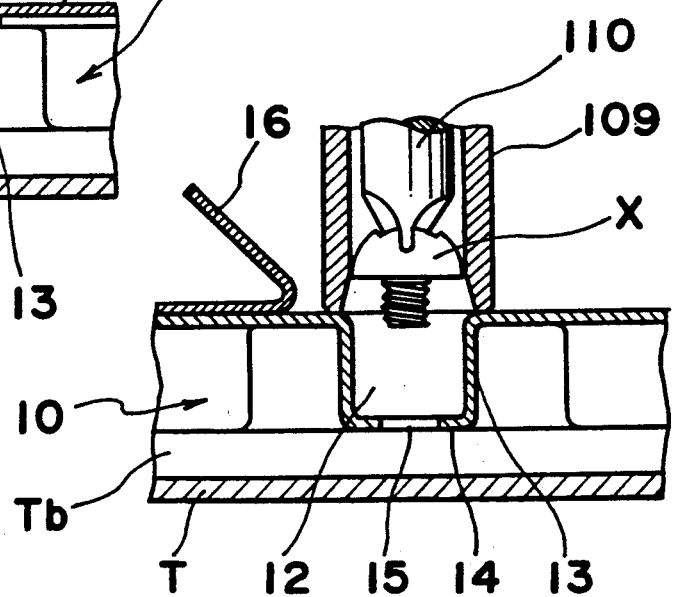

The screw driver referred to in the description of FIGS. 12 and 13 is preferably carried by a manipulator shown in FIG. 14 and generally identified by M. The manipulator M shown in FIG. 14 comprises a carriage Ma having a boom Mb mounted thereon for movement together therewith, said boom Mb being provided at one end with the screw driver. It is to be noted that the carrier strip 10 is shown as having a plurality of, for example, five, rows of the screw members and is also shown as supplied from a supply roll SR towards a take-up roll TR.

Although the present invention has been fully described in connection with the preferred embodiments thereof with reference to the accompanying drawings, it is to be noted that numerous changes and modifications are apparent to those skilled in the art. Such changes and modifications are to be understood as included within the scope of the present invention as defined by the appended claims.

What is claimed is:

1. A method of fastening a screw member having a head and a stem to a workpiece disposed at a work station, said method comprising:
   providing a fastener carrier comprising a carrier strip having a plurality of apertures extending therethrough and screw members supported on said carrier strip while extending through said apertures, respectively;
   transporting said carrier strip in the longitudinal direction thereof until one of the screw members arrives at a fastening station disposed above the work station;
   lowering a vacuum sleeve having a bit of an automatic screwdriver therein at said fastening station onto said carrier strip over the head of said one of the screw members;
   generating a vacuum in the vacuum sleeve to suck said one of the screw members to the bit of the automatic screwdriver;
   lowering the bit of the automatic screwdriver within said vacuum sleeve until said bit forces said one of the screw members sucked thereto through said carrier strip and toward said work station; and
   subsequently screwing said one of said screw members with said bit into a workpiece disposed at said work station.

2. A method as claimed in claim 1,
   and further comprising rotating said bit when said bit engages said one of the screw members, and continuing to rotate the bit as the bit forces said one of the screw members through said carrier strip.

3. A method as claimed in claim 2,
   wherein the lowering of said vacuum sleeve is terminated when the vacuum sleeve contacts said carrier strip.

4. A method as claimed in claim 1,
   wherein the providing of a fastener carrier comprises providing a fastener carrier having a plurality of pockets extending from and open at the carrier strip, a diameter of each of the pockets at the strip being less than a diameter of a tip end of the vacuum sleeve, the apertures extending through bottoms of the pockets, respectively, and the head of each of the screw members resting on the bottom of a respective pocket with the stem thereof extending through a respective said aperture.

5. A method of fastening a screw member having a head and a stem to a workpiece disposed at a work station, said method comprising:
   providing a fastener carrier comprising a carrier strip having a plurality of apertures extending therethrough and screw members supported on said carrier strip while extending through said apertures, respectively;
   transporting said carrier strip in the longitudinal direction thereof until one of the screw members arrives at a pick up station spaced from the work station;
   lowering a vacuum sleeve having a bit of an automatic screwdriver therein at said fastening station onto said carrier strip over the head of said one of the screw members;
   generating a vacuum in the vacuum sleeve to suck said one of the screw members to the bit of the automatic screwdriver;
   moving the automatic screwdriver with said one of the screw members sucked to the bit thereof to said work station; and
   lowering the bit relative to the vacuum sleeve, and rotating the bit to screw said one of said screw members into the workpiece disposed at said work station.

6. A method as claimed in claim 5,
   wherein the providing of a fastener carrier comprises providing a fastener carrier having a plurality of pockets extending from and open at the carrier strip, a diameter of each of the pockets at the strip being less than a diameter of a tip end of the vacuum sleeve, the apertures extending through bottoms of the pockets, respectively, and the head of each of the screw members resting on the bottom of a respective pocket with the stem thereof extending through a respective said aperture.

7. A method of fastening a screw member having a head and a stem to a workpiece disposed at a work station, said method comprising:

provising a fastener carrier comprising a carrier strip having a plurality of apertures extending therethrough and screw members supported on said carrier strip while extending through said apertures, respectively;

transporting said carrier strip in the longitudinal direction thereof until one of the screw members arrives at a fastening station disposed above the work station;

lowering a vacuum sleeve having a bit of an automatic screwdriver therein at said fastening station onto said carrier strip over the head of said one of the screw members;

terminating the lowering of the vacuum sleeve once the vacuum sleeve has come into contact with the carrier strip;

generating a vacuum in the vacuum sleeve to suck said one of the screw members to the bit of the automatic screwdriver;

lowering the bit of the automatic screwdriver within said vacuum sleeve while the vacuum sleeve remains in contact with the carrier strip until said bit forces said one of the screw members sucked thereto through said carrier strip and toward said work station; and subsequently screwing said one of said screw members with said bit into a workpiece disposed at said work station.

8. A method as claimed in claim 7, and further comprising rotating said bit when said bit engages said one of the screw members, and continuing to rotate the bit as the bit forces said one of the screw members through said carrier strip.

9. A method as claimed in claim 7, wherein the providing of a fastener carrier comprises providing a fastener carrier having a plurality of pockets extending from and open at the carrier strip, a diameter of each of the pockets at the strip being less than a diameter of a tip end of the vacuum sleeve, the apertures extending through bottoms of the pockets, respectively, and the head of each of the screw members resting on the bottom of a respective pocket with the stem thereof extending through a respective said aperture.

10. A method of fastening a screw member having a head and a stem to a workpiece disposed at a work station, said method comprising:

providing a fastener carrier comprising a carrier strip having a plurality of apertures extending therethrough and screw members supported on said carrier strip while extending through said apertures, respectively;

transporting said carrier strip in the longitudinal direction thereof until one of the screw members arrives at a pick up station remote from the work station;

lowering a vacuum sleeve having a bit of an automatic screwdriver therein at said pick up station onto said carrier strip over the head of said one of the screw members;

generating a vacuum in the vacuum sleeve to suck said one of the screw members to the bit of the automatic screwdriver;

moving the vacuum sleeve and the bit off of and away from the fastener carrier and to the work station once the vacuum sleeve has been lowered onto the carrier strip and said one of the screw members has been sucked to the bit; and lowering the bit relative to the vacuum sleeve, and rotating the bit to screw said one of said screw members into the workpiece disposed at said work station.

11. A method as claimed in claim 10, wherein the providing of a fastener carrier comprises providing a fastener carrier having a plurality of pockets extending from and open at the carrier strip, a diameter of each of the pockets at the strip being less than a diameter of a tip end of the vacuum sleeve, the apertures extending through bottoms of the pockets, respectively, and the head of each of the screw members resting on the bottom of a respective pocket with the stem thereof extending through a respective said aperture.

* * * * *